United States Patent [19]

Schwarz

[11] 4,301,496
[45] Nov. 17, 1981

[54] USE OF AN INDUCTOR WITHIN A FULL BRIDGE D.C.-D.C. POWER CONVERTER

[75] Inventor: Albrecht Schwarz, North Caldwell, N.J.

[73] Assignee: International Telephone and Telegraph Corporation, New York, N.Y.

[21] Appl. No.: 77,073

[22] Filed: Sep. 19, 1979

[51] Int. Cl.³ .............................................. H02M 1/12
[52] U.S. Cl. ..................................... 363/17; 363/132; 363/40
[58] Field of Search .................... 363/40, 41, 131–134, 363/136, 17

[56] References Cited
U.S. PATENT DOCUMENTS
3,248,637 4/1966 Albert et al. .................... 363/136 X OTHER PUBLICATIONS
E. T. Calkin, B. H. Hamilton, "A Conceptually New Approach for Regulated DC to DC Converters Employing Transistor Switches and Pulsewidth Control", *IEEE Transactions on Industry Applications*, vol. 1A-12, No. 4, Jul./Aug. 1976, pp. 369–377.

*Primary Examiner*—William M. Shoop
*Attorney, Agent, or Firm*—John T. O'Halloran; Peter C. Van Der Sluys

[57] ABSTRACT

A multiple output power converter utilizing a circuit on the primary side of a power transformer so as to convert a direct current input into an alternating current output. Said circuit utilizing transistor switching and free wheeling diodes so as to provide continuous current to the primary winding of the power transformer and further utilizing a two winding choke filter in said circuit so as to eliminate the need for choke filtering of the direct current output of a secondary.

13 Claims, 5 Drawing Figures

USE OF AN INDUCTOR WITHIN A FULL BRIDGE D.C.-D.C. POWER CONVERTER

FIELD OF THE INVENTION

The invention relates to a power converter having limited choke filtering on the primary of a power transformer.

BACKGROUND OF THE INVENTION

The use of multiple output converters having a primary and secondary of a power transformer utilizing choke filters for each output is well known. The choke filter is usually an inductor used as in low pass filter in which the useful output is a direct current. In power converters it is used as a filter of a power rectifier in a secondary to filter out resulting superimposed ripples. At the usual power frequencies, the filter choke may have an iron core, with an air gap to minimize variations of inductance with the direct current. As shown in FIGS. 1 and 2, a multi-output pulse width modulated (PWM) power supply is shown utilizing choke filtering on the secondary of the power transformer. This is a typical four transistor PWM whereby the output is controlled by switching the transistors on and off by control circuitry to maintain an appropriate output. Each output requires the rectifying of a diode steering bridge along with the filtering by a choke filter and a capacitor to smooth out the resulting pulsating current. In a power supply with many outputs or in a case of high voltage output, the choke filters involved may be too bulky for high density packaging which finds ever increasing applications.

Because of this, the use of systems requiring choke filtering on the output of the secondary have been somewhat limited in their application especially in airborne equipment. And accordingly there exists a need for a multi-output PWM power converter that can be utilized in high density packaging while insuring effective operation of the system.

SUMMARY OF THE INVENTION

Accordingly, it is a principal object of the invention to eliminate the use of choke filters in the secondary circuit of a multi-output PWM power supply.

It is another object to provide for the use of a two winding choke on the primary side of the power transformer and provide continuous conduction through the power transformer thereby allowing a reduction in size as compared to that previously utilized.

It is a further object to provide for such a system that eliminates the choke filtering on the secondary while reducing the voltage stress on the circuits.

These and other objects are met by the arrangement provided which utilizes a two winding choke arrangement in the primary of the power transformer to replace all of the output choke filters formerly utilized on the secondary of the power transformer circuit. This allows for high packaging density power supplies for both low and high voltage usage and improves converter performance. In this regard, a two winding choke is used on the primary side circuit of the power transformer. This choke is smaller than the combined chokes it replaces and since the power transformer will be subject to continuous conduction as compared to the conventional approach of pulse width conduction, the power transformer can be of smaller size of that usually utilized in such systems while still being effective.

The primary side circuit basically consists of a four transistor circuit connected with a primary winding of a high voltage transformer, two free-wheeling diodes and the two winding choke. Two of the transistors conduct alternatively with a change in the conduction ratio providing a means for changing the desired voltage output. The remaining two transistors are in the on state during the alternating half periods of the aforementioned transistors with the free-wheeling diodes providing a current path to allow continuing current through the high voltage transformer throughout the cycle. The choke serves as a voltage divider between the input voltage and the transformer. The resulting transformer output voltage will be smooth with no undesired pulsating d.c. after rectifying.

Alternate embodiments of the invention are provided which reduce the voltage stress or the current. It will readily become apparent that the objects and advantages of the present arrangement can be realized by the present invention disclosed by the description herewith taken in conjunction with the appended drawings.

DETAILED DESCRIPTION OF THE DRAWINGS

Figure 1:
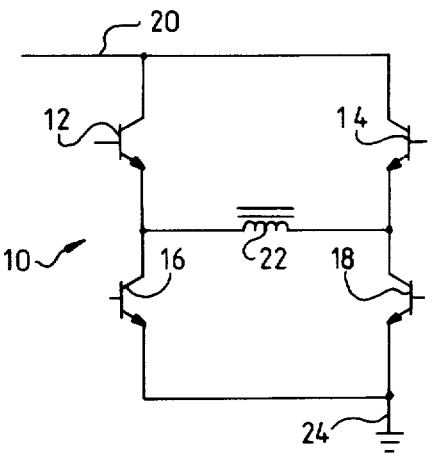
FIG. 1 is a schematic representation of the primary circuit of a conventional PWM power converter.
Figure 2:
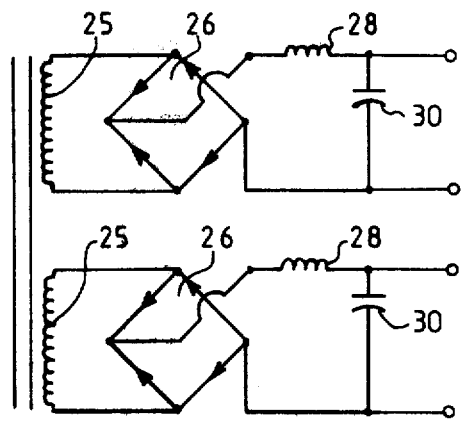
FIG. 2 is a schematic representation of the secondary circuit of a conventional power converter.

With regard now to FIGS. 1 and 2, there is shown a conventional PWM power converter circuit 10 utilizing in the primary circuit four transistors 12, 14, 16 and 18. A potential 20 is applied at the collectors of transistors 12 and 14 with their emitters connected to the junction of a high voltage transformer 22 and the collectors of transistors 16 and 18 respectively. The emitters of transistors 16 and 18 are coupled with a ground source 24. Output of the circuit is controlled by the transistors 12 and 18, and 14 and 16, being switched on alternatively at different cycles. The variation of the conduction state is provided by control circuitry (not shown) of a conventional nature which usually involves the placement of the current to the base of the transistor to switch on, with a removal thereof causing a switch off.

Through the controlling circuitry as mentioned transistor operation may be regulated and in turn the output may be changed as desired. The transformer 22 output provides an input into the secondary windings 24 shown in FIG. 2. By applying a direct current potential on the circuit 10 and through the use of the controlling circuitry, the output of the transformer primary can be regulated as desired. This would involve the alternating of the current across the primary winding causing an induced alternating current on the secondary. The circuit can operate as an invertor if so desired by utilizing the alternating current in the A.C. form on the output of the secondary. Alternatively the secondary, if so desired and as shown, may include a means of rectifying so as to convert the alternating current to a direct current thereby having a D.C.—D.C. converter. This would include the winding 25 being connected to a diode steering bridge circuit 26 in turn connected with an inductor or choke 28 in series with a capacitor 30 across the secondary leads. The inductor or choke filter acts to smooth out the ripples in the resulting pulsating current, as which is normally the situation in such current converters. While two secondary outputs are shown, many outputs may be utilized in various applications, including high density packaging as in airborne operation.

Figure 3:
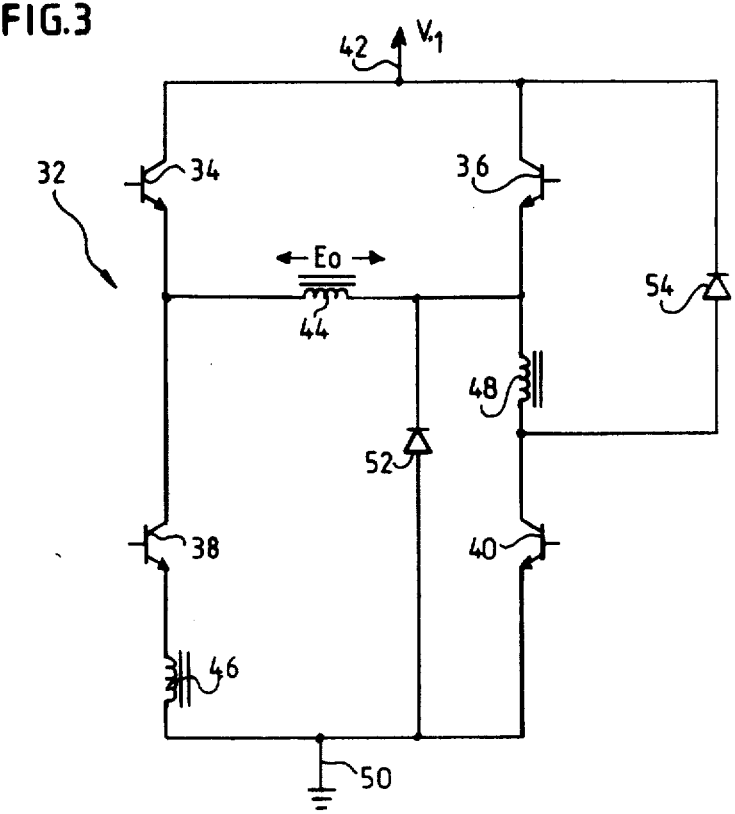
FIG. 3 is a schematic representation of the primary circuit of a PWM power converter having a two winding choke on the primary rather than the secondary.

In this regard, the present arrangement provides for elimination of the choke filters in each of the secondary circuits through the use of the circuit depicted in FIG. 3. Its basic operation is somewhat similar to that previously described with respect to the circuit shown in FIG. 1. However, the primary circuit 32 advantageously allows filtering the ripples in the pulsating current in the primary side of the transformer by choke filters or inductors rather than on the secondary while allowing for continuous operation.

The primary circuit 32 is provided with four transistors, 34, 36, 38 and 40 with the collectors of transistors 34 and 36 connected or joined to a source of direct current potential ($V_1$) 42. The emitters of transistors 34 and 36 are connected to a high voltage transformer 44. This transformer provides an output to a secondary circuit with said output also being designated at $E_o$. As in the case of FIG. 1, this output is intended to be utilized by numerous secondaries of the type shown in FIG. 2 with the difference being that since filtering will be provided on the primary, the secondaries would only need a winding, diode steering circuit and a capacitor making it capable of high density packaging. In addition, as later discussed, the transformer 44 may be of smaller dimensions than that previously utilized in the same applications since in operation, current flowing therethrough will be continuous, rather than intermittant.

The emitter of transistor 34 is also connected to the collector of transistor 38. Its emitter connects to one winding or inductor 46 on a two winding choke. On the opposite side of the circuit, the other winding or inductor 48 of the two winding choke is interposed between the emitter of transistor 36 and transformer 44 connection thereto and the collector of transistor 40. The emitter of transistor 40 is then connected to ground 50. Provided in the circuit are two free-wheeling diodes 52 and 54 which provide current paths to insure continuous current conduction through the transformer 44 during operation. The diode 52 is interposed between the ground 50 and the transformer 44, emitter of transistor 36 and inductor 48 connection. The other diode 54 allows a path for current through the collector of transistor 40 side of the inductor 48, with its opposite end connected to the junction of the collectors of transistor 34 and 36 and the potential 42.

In the switching sequence of the transistors during a period P is as follows.

At $p_1$, transistors 34 and 40 are on for this interval allowing current to pass through the transformer 44 and inductor 48; then transistor 34 is left on with transistor 40 turned off for period $p_2$. When transistor 40 is off, free wheeling current exists through transistor 34 and diode 54. This current again, is also passing through transformer 44 with inductor 48 as the current source.

At $p_3$, transistors 36 and 38 are on allowing current to pass through the transformer 44 and inductor 46 in the reverse to that during $p_1$ and $p_2$. Then at $p_4$ transistor 38 is left on with transistor 36 turned off. During this time, free wheeling current now exists through transistor 38 and diode 52 which results in current passing through the transformer 44, with inductor 46 as the current source. The process then repeats itself.

Figure 4:
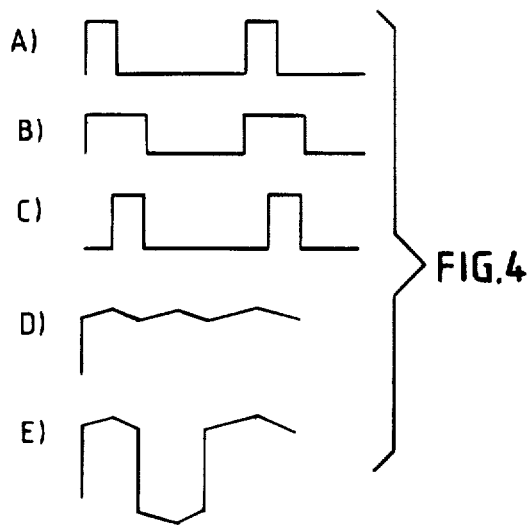
FIG. 4 depicts wave form representations of current distribution during operation of the system shown in FIG. 3.

Representative of the current wave form during operation is shown in FIGS. 4A-E. In FIG. 4A there is depicted the ideal current flowing through transistors 34 and 40, transformer 44 and inductor 48 during $p_1$. FIG. 4C depicts the ideal current during $p_2$ which flows through diode 54, transistor 34, transformer 44 and choke 48. FIG. 4B depicts the ideal current through transistor 34 during period $p_1$ and $p_2$, which is the sum of the current shown in FIGS. 4A and 4C. Similar wave forms may be envisioned for the current through transistors 36 and 38 and diode 52 respectively.

With regard to FIG. 4D there is shown that the effective current through the two inductor 46 and 48 is continuous, with the current at inductor 46 alternating with that of inductor 48. FIG. 4D also represents the current drawn from the supply $v_1$. The indicated slopes are due to the fact that a finite value of inductance of choke 46 and 48 is used. The larger the inductance value the flatter the slope becomes and in the limit will appear like the ideal wave slopes shown in FIGS. 4A, 4B and 4C. Also shown by FIG. 4E is that the continuous wave form of the current passing through the transformer and transistors 38 and 34 alternating at 180°. The indicated slopes are the same as described for FIG. 4D. Since the current passing through the transformer is continuous, the transformer may be decreased in size while still providing a desirous output as compared to conventional apparatus.

For the circuit shown in FIG. 3, the operation cycle $E_o/V_1=(p_1+p_3)/(P)$ and the instantaneous voltage stress (V ce) on the circuit would now be equal to $E_o+V_1$ for a maximum of $2V_1$.

Figure 5:
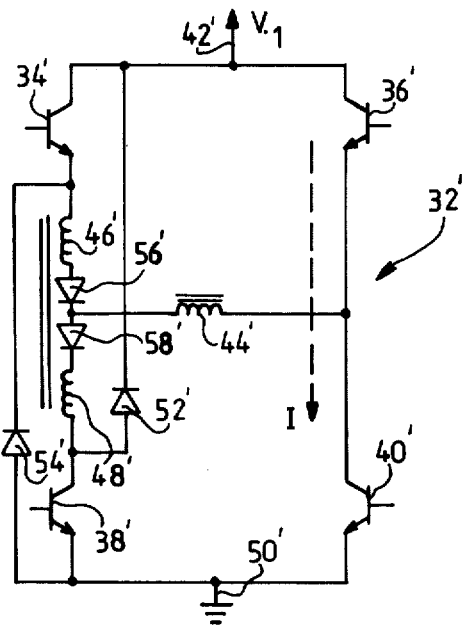
FIG. 5 is a schematic of an alternate representation of a primary circuit incorporating the teachings of the invention.

To adjust for the voltage stress, an alternate embodiment of the invention is provided by circuit 32' as shown in FIG. 5, with like parts to the previous embodiment similarly numbered with a designated '. In this circuit Vce maximum is equal to $V_1$. The circuit is provided with four transistors 34', 36', 38' and 40' along with transformer 44' in addition to the blocking diodes 54' and 56'. However, the choke, with windings or inductors 46' and 48', is in a series arrangement between the emitter of transistor 34' and collector of transistor 38'. The connection to the transformer 44' is located between said inductors and the blocking diodes with a diode 52' connected between the junction of the inductor 48' and collector of transistor 38' and the potential 42' and diode 54' connected between the ground 50' and the junction of the inductor 46' and the emitter of transistor 34'. The diodes 54' and 56' are required to prevent reverse breakdown of transistors 34' and 38'. They do not affect the theoretical explanation of the circuit.

The operation of this circuit is similar to that previously described for FIG. 3. The switching sequence for period P is as follows: at $p_1$, transistors 34' and 40' are on, with current passing through the transformer 44', diode 56' and inductor 46'; at $p_2$ transistor 34' is turned off with 40' remaining on. When transistor 34' is off, free-wheeling current exists through the transformer 44', transistor 40' and diodes 54', 56' and inductor 46'. At $p_3$ transistors 36' and 38' are on with current passing through the transformer 44′ diode 58′ and inductor 48′ in reverse to that of $p_1$ and $p_2$. Similarly at $p_4$, transistor 36′ remains on while transistor 38′ is turned off with a current now existing through transistor 36′, transformer 44′ and diodes 52′ and 58′ and inductor 48′.

This circuit has the added advantage that now the maximum stress of Vce is equal to $V_1$. However, since transistors 36′ and 40′ are on 180° each, care must be taken to prevent an overlap of current, designated by I, which may be destructive to the system. This may be prevented by turning transistor 36′ off slightly before the end of $p_4$. Similarly transistor 40′ is turned off slightly before the end of $p_2$.

This established a dwell time when for which all four transistors are off. During this period of time the current in inductor 46′-48′ will free wheel through diode 52′ through the source $V_1$ to ground 50′ and through diode 54′.

While a number of embodiments of the invention have been disclosed and described herein utilizing merely illustrative elements (i.e., transistors, free-wheeling diodes, inductor choke filters, etc.) in detail, it should be understood that the invention is not limited thereby and its scope should be determined by that of the appended claims.

What is claimed is:

1. A circuit connected to the primary winding of a power transformer, said circuit adapted to receive a direct current input, including: a connecting means interconnecting said primary winding and direct current input; a choke filtering means having two windings interconnected with said connecting means and primary winding; and said connecting means capable of causing periodic change in the direction of direct current through the primary winding while periodically connecting separate choke windings thereto to develop an output while allowing the current to be filtered by the choke filtering means.

2. The circuit in accordance with claim 1 wherein said connecting means allows continuous alternating conduction of current through the primary winding compared to pulsating current in conventional schemes, with each choke winding being capable of periodically providing a current source to the primary winding during operation of the circuit.

3. The circuit in accordance with claim 1 or 2 further including a secondary winding of a power transformer capable of having an alternating current induced on said winding by the output of the primary winding and leads connected thereto to provide an output current.

4. The circuit in accordance with claim 3 wherein said secondary circuit further includes a full wave rectifying means interposed between said secondary winding and said leads wherein when the alternating current is induced it is rectified with the resulting output of the leads being a direct current.

5. The circuit in accordance with claim 4 wherein said full wave rectifying means is a diode steering bridge.

6. The circuit in accordance with claims 4 or 5 further including a capacitor connected across the leads of the secondary circuit, after the full wave rectifying means, to provide further filtering of the direct current to said leads.

7. The circuit in accordance with claim 1 or 2 wherein the connecting means includes; at least 4 transistors, $t_1$, $t_2$, $t_3$, and $t_4$ and at least two free wheeling diodes $d_1$ and $d_2$.

8. The circuit in accordance with claim 7 wherein said transistors $t_1$ and $t_3$ are adapted to receive the direct current input and transistors $t_4$ and $t_2$ connect to a ground; said diode $d_1$ is adapted to allow current to pass through $t_4$ when $t_3$ is in its off state and $d_2$ allows current to pass through $t_1$ when $t_2$ is in its off state.

9. The circuit in accordance with claim 8 whose operational sequence includes:

$t_1$ and $t_2$ are in their on state for a period $p_1$ allowing current to pass through primary winding of the transformer while being filtered by the choke filtering means; then $t_2$ is placed in its off state with $t_1$ remaining on for a period $p_2$, allowing current to pass through the primary winding of the transformer via $d_2$ while being filtered by the choke filtering means with said current passing through said winding in the same direction as that during $p_1$;

then $t_3$ and $t_4$ are placed on their on state for a period $p_3$, allowing current to pass through the primary winding of the transformer while being filtered by said choke filtering means, with this current passing through said winding in an opposite direction to the direction of the current during $p_1$ and $p_2$;

then $t_3$ is placed in its off state with $t_4$ remaining on for a period $p_4$, allowing for current to pass through the primary winding of the transformer via $d_1$ while being filtered by said choke filtering means, with this current passing through said winding in an opposite direction to the direction of the current during $p_1$ and $p_2$; thereby allowing for continuous current to flow through the primary winding of the transformer in alternating directions throughout its entire period of $p_1$ through $p_4$.

10. The circuit in accordance with claim 7 wherein said transistors $t_1$ and $t_3$ being adapted to receive the direct current input and transistors $t_4$ and $t_2$ connect to a ground, said diode $d_1$ is adapted to allow current to pass through $t_3$ when $t_4$ is in its off state and $d_2$ is adapted to allow current to pass through $t_2$ and $t_1$ is in its off state.

11. The circuit in accordance with claim 10 whose operational sequence includes:

$t_1$ and $t_2$ are in their on state for a period $p_1$ allowing current to pass through primary winding of the transformer while being filtered by the choke filtering means;

then $t_1$ is placed in its off state with $t_2$ remaining on for a period $p_2$ allowing current to pass through the primary winding of the transistor via $d_2$ while being filtered by the choke filtering means with this current passing through said winding in the same direction as that during $p_1$;

then $t_3$ and $t_4$ are placed on their state for a period $p_3$, allowing current to pass through the primary winding of the transformer while being filtered by said choke filtering means, with this current passing through said winding in an opposite direction to the direction of the current during $p_1$ and $p_2$;

then $t_4$ is placed in its off state with $t_3$ remaining for a period $p_4$ allowing for current to pass through the primary winding of the transformer via $d_1$ while being filtered by said choke filtering means, with this current passing through said winding in an opposite direction to the direction of the current during $p_1$ and $p_2$;

thus, the circuit allows for continuous current to flow through the primary winding of the transformer in alternating directions throughout its entire operational period of $p_1$ through $p_4$.

12. The circuit in accordance with claim 10 which further includes two blocking diodes interconnected with the circuit so as to prevent the breakdown of transistors $t_1$ and $t_4$ during operation.

13. A circuit connected to the primary winding of a power transformer, said circuit adapted to receive a direct current input, including: a connecting means interconnecting said primary winding and direct current input; a choke filtering means having two windings interconnected with said connecting means and primary winding, with each choke winding capable of periodically providing a current source to the primary winding during operation of the circuit; and said connecting means capable of allowing continuous alternating conduction of current through the primary winding to develop an output while allowing the current to be filtered by the choke filtering means.

* * * * *